Sept. 18, 1928.
J. L. DAY ET AL
1,684,662
ANTIRATTLING DEVICE FOR AUTOMOBILE DOORS
Filed Jan. 3, 1928     2 Sheets-Sheet 1
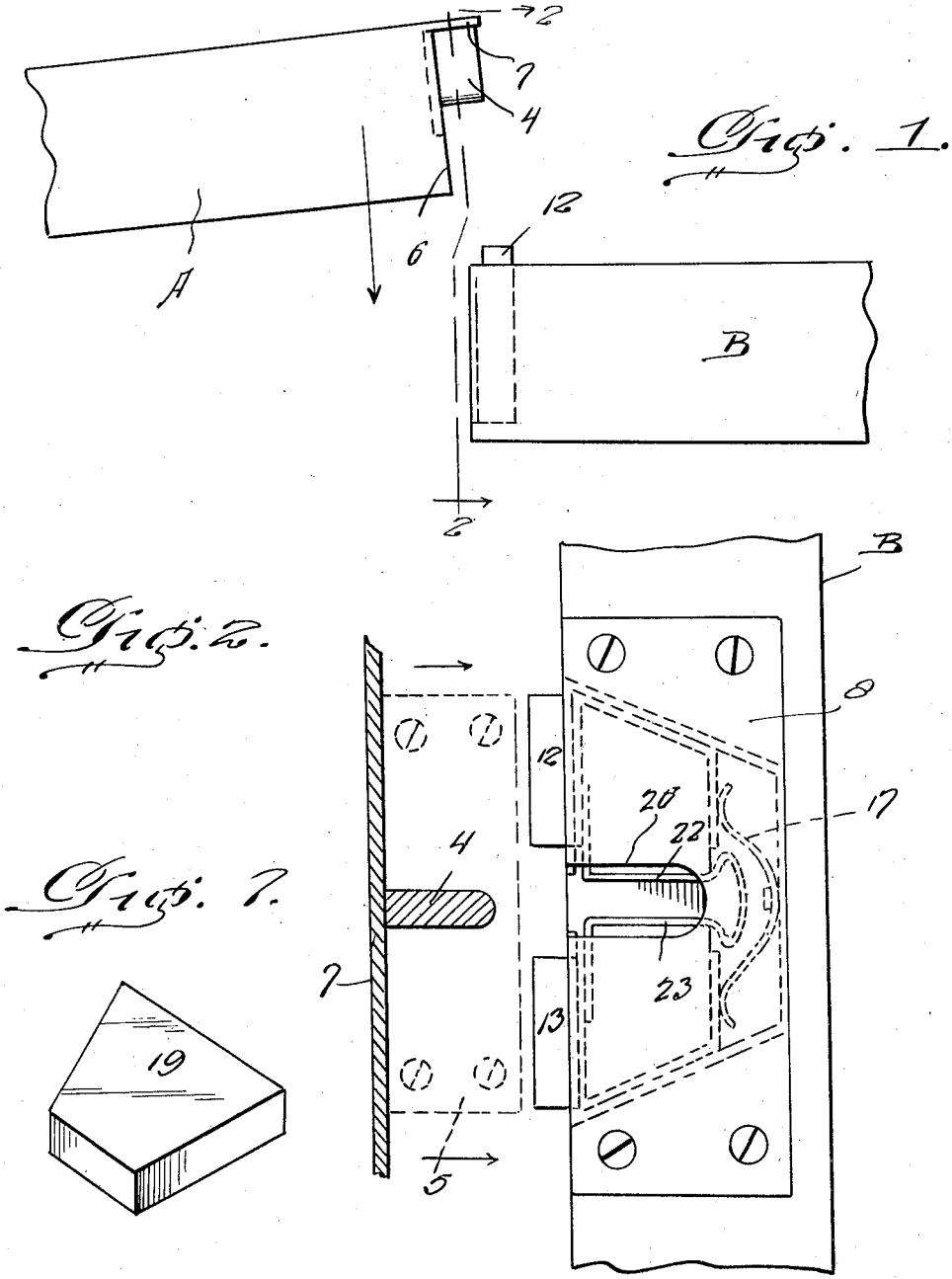
Inventors
J. L. Day.
E. L. Deschler;
By *Clarence A. O'Brien*
                                        Attorney Sept. 18, 1928.  1,684,662
J. L. DAY ET AL
ANTIRATTLING DEVICE FOR AUTOMOBILE DOORS
Filed Jan. 3, 1928  2 Sheets-Sheet 2
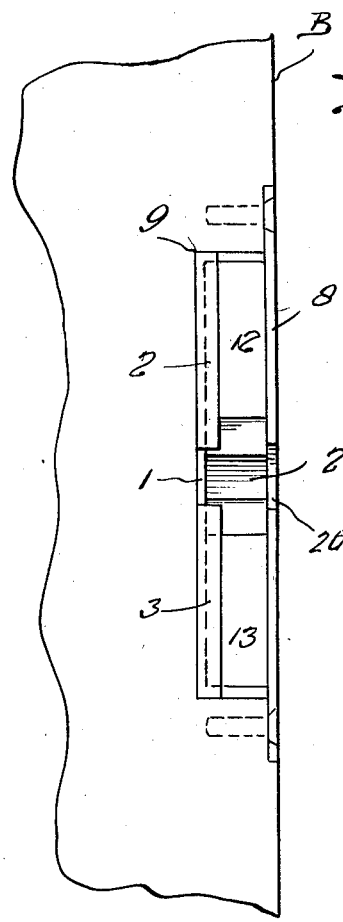
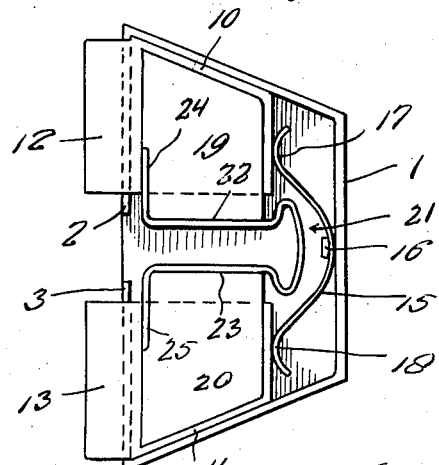
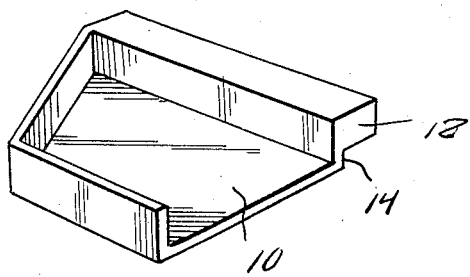
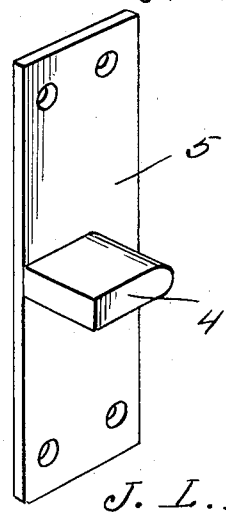
Inventors
J. L. Day,
E. L. Deschler;
By Clarence A O'Brien
Attorney Patented Sept. 18, 1928.

1,684,662

UNITED STATES PATENT OFFICE.

JACK L. DAY AND EDWARD L. DESCHLER, OF SACRAMENTO, CALIFORNIA.

ANTIRATTLING DEVICE FOR AUTOMOBILE DOORS.

Application filed January 3, 1928. Serial No. 244,234.

The present invention relates to improvements in anti-rattling devices and has for its principal object to provide a device for association with an automobile for the purpose of preventing any movement of the doors thereof after the same have been shut or closed, thereby eliminating all unnecessary noises.

One of the important objects of the present invention is to provide an automobile anti-rattling device of the above mentioned character which will at all times be positive and efficient in its operation, the same being further simple in construction, inexpensive, strong and durable and further well adapted to the purpose for which it is designed.

A still further object of the invention is to provide an anti-rattling device of the above mentioned character that can be readily and easily installed without necessitating any material alterations of the parts of the door frame.

Other objects and advantages of the invention will become apparent from the following description when taken in connection with the accompanying drawings.

In the accompanying drawings forming part of the application:

Figure 1 is a top plan view showing an automobile door in the act of being closed, and disclosing the normal position of the striker projection.

Figure 2 is a sectional view taken substantially on the line 2—2 of Figure 1 looking in the direction of the arrows.

Figure 3 is a front edge elevation of the anti rattling device embodying our invention showing the manner in which the same is set in the door frame.

Figure 4 is a side elevation of the anti-rattling device per se.

Figure 5 is a detail perspective view of one of the slidable boxings that is formed with a strike projection at its forward edge.

Figure 6 is a detail perspective view of the plate that is secured on the free edge portion of an automobile door and which is provided with the usual laterally extending lug, and Figure 7 is a detail perspective view of one of the resilient blocks that is associated with each of the slidable boxings.

In the drawings wherein for the purpose of illustration is shown the preferred embodiment of our invention, the numeral 1 designates a substantially trapezoidal shaped casing, one side of which is open and as is clearly illustrated in Figures 3 and 4 of the drawings, the forward edge of the casing is open. Flanges 2 and 3 respectively extend inwardly from the forward edge of the closed side of the casing and the inner opposed ends of these flanges are spaced with respect to each other for the purpose of providing a passage for the lug 4 that extends laterally from the rectangular plate 5, the latter being secured on the edge portion 6 of the swinging door of an automobile, which door is designated by the letter A. The door is provided with the usual lateral flange 7 along its outer free edge that will extend over the adjacent edge portion of the door frame B.

This casing is set in a suitable recess formed in the edge portion of the door frame B, and a face plate 8 is secured on the edge of the door frame B to cover the open side of the casing 1 as is clearly disclosed in Figures 2 and 3 of the drawings. The recess 9 that is formed in the door frame to accommodate the casing is of such size as to cause the forward edge portion of the casing to be disposed flush with the outer face of the door frame.

The invention further comprehends the provision of a pair of opposed boxings 10 and 11, respectively, that are adapted for slidable movement within the casing 1. Each boxing is open at its outer side and also at its adjacent end, the opposite end portion of the boxing being so shaped as to cooperate with the converging end portions of the trapezoidal shaped casing 1 whereby a wedging action will be affected in the manner to be presently described.

Striker projections 12 and 13 are formed on the forward edge portion of the boxings 10 and 11 respectively, and these projections extend for the full length of the forward edges of the boxings and are of such thickness as to be adapted for slidable movement between the free longitudinal edges of the flanges 2 and 3 formed on the closed side of the casing 1, and the face plate 8.

The striker projections 12 and 13 are so formed on the forward edges of the boxings as to provide the shoulders 14 and the flanges 2 and 3 cooperate with the shoulders of the respective boxings to limit the outward sliding movement of said boxings.

A leaf spring 15 is secured at its intermediate portion to the rear wall of the casing 1 as at 16, the free ends of the leaf spring being curved reversely with respect to the curvature of the intermediate portion of the leaf spring and the curved free ends 17 and 18 of the spring 15 engage the rear edge portions of the boxings 10 and 11, respectively, for normally urging the same outwardly whereby to maintain the striker projections 12 and 13 beyond the front of the casing and also beyond the outer face of the door frame B.

Rubber blocks 19 and 20 are arranged within the boxings 10 and 11 respectively and the inner opposed faces or edge portions of these blocks are arranged in parallel spaced relation and furthermore project beyond the inner opposed edges of the open ends of the boxings. The outer opposed ends of the rubber blocks are cut off at an angle so as to properly engage the angularly disposed outer end portions of the boxings. In Figure 7 there is shown a detailed perspective view of one of these rubber blocks.

The rubber blocks 19 and 20 are normally held apart through the medium of the spring shown generally at 21. This spring consists of an elongated flat strip of spring metal that is bent intermediate its ends to form a pair of parallel disposed arms 22 and 23, respectively, the free ends thereof being disposed outwardly in opposite directions as illustrated at 24 and 25 with reference more particularly to Figure 4 and the laterally extending outer free ends of these arms are disposed between the forward edges of the rubber blocks and the inner faces of the respective forward edges of the boxings.

The resilient arms 22 and 23 furthermore cooperate to provide a guide for the door lugs 4 and as is clearly shown in the drawings, the entrance between the arms is located in alinement with the space formed between the flanges 2 and 3. It will also be observed that the face plate 8 is cut out at this particular point, the cut out portion extending from the outer edge of the plate to a point adjacent the opposite sides and the cut out portion is designated by the numeral 26 in Figure 2.

In operation it will be observed that when the door A is moved to a closed position with respect to the door frame B the lugs 4 will pass between the spring arms 22 and 23 and due to the force applied by the outer curved ends of the leaf spring 15 against the boxings 10 and 11, and further due to the shape of the ends of the housing, the rubber blocks will exert an inward pressure on the spring arms 22 and 23 whereby said arms will cooperate to grip the lugs and cause the door to be supported in a rigid manner against vertical movement, and when the flange 7 of the door strikes the projections 12 and 13, the boxings will be forced inwardly against the tension of the spring 15 and thus exert such pressure on the door as to prevent movement of the door in a lateral direction.

In this manner the device will prevent any possibility of the door rattling, and thereby eliminate all unnecessary noises. Furthermore the anti-rattling means is of such construction as to permit the door to be readily and easily opened whenever necessary. Also a device of the above mentioned character can be manufactured at a very low cost and can be furthermore readily and easily installed without necessitating any material alterations of the door frame.

While we have shown the preferred embodiment of our invention, it is to be understood that minor changes in the size, shape and arrangement of parts may be resorted to without departing from the spirit of the invention and the scope of the appended claims.

While we have shown the preferred embodiment of our invention, what we claim as new is:—

1. In an anti-rattling device for automobile doors, a casing secured in a recess formed in the door frame, a pair of opposed members arranged for slidable movement in the casing, resilient means interposed between the rear wall of the casing and the inner ends of the slidable members for normally urging said members forwardly, striker projections formed on the forward edges of the slidable members and normally disposed beyond the outer face of the door frame, a pair of spring arms arranged between the inner opposed edges of the slidable members for normally urging the same outwardly against the sides of the casing and further adapted to receive the lug on the edge of the door, the flange on the edge of the door striking said projection when the door is moved to a closed position and simultaneously forcing the slidable members rearwardly and also urging the spring arms into locking engagement with the lugs.

2. In an anti-rattling device for automobile doors, a casing secured in a recess formed in the door frame, the end walls of the casing gradually converging toward the rear of the casing, a pair of opposed spaced members arranged for slidable movement within the casing, the outer ends thereof being shaped to conform to the converging end walls of the casing, resilient means interposed between the rear wall of the casing and the inner ends of the slidable members for normally urging the same forwardly, striker projections arranged on the forward edges of the slidable member and normally extending beyond the outer face of the door frame, means interposed between the opposed slidable members for normally urging the same outwardly against the converging ends of the casing, said last mentioned means providing a guide for the lugs on the edge of the door, the flange on the edge of the door engaging said striker projections and forcing the slidable members rearwardly during the swinging of the door to a closed position, and simultaneously moving the slidable members inwardly toward each other to effect the gripping of the lug by said aforesaid means, said aforementioned means comprising a pair of spring arms disposed in parallel spaced relation, the forward ends of the arms being disposed laterally and secured to the slidable members.

3. In an anti-rattling device for automobile doors, a casing for disposition with a recess in a door frame, the end walls of the casing converging gradually toward the rear wall, a pair of opposed boxings arranged within the casing for slidable movement, the inner opposed ends of the boxings being normally spaced from each other, the outer ends of the boxings being shaped to conform to the converging end walls of the casing, rubber blocks arranged within the boxings, the inner opposed ends of the rubber blocks being normally spaced from each other, resilient means interposed between the rear wall of the casing and the inner ends of the boxing for normally urging the same forwardly, means at the forward edge of the casing for limiting the outward sliding movement of said boxings, striker projections formed on the forward edge of the boxings and normally extending beyond the outer face of the door frame, and a keeper for the lugs on the edge of the door arranged between the rubber blocks, the flange on the edge of the door adapted to come in contact with the striker projections during the closing of the door whereby to move the boxings rearwardly and simultaneously force the boxings inwardly toward each other to securely maintain the lug within the keeper, said keeper comprising a flat strip of spring metal bent intermediate its ends to provide a pair of parallel spaced arms, the free ends of the arms being disposed laterally in an outward direction for disposition between the forward edges of the rubber blocks and the adjacent sides of the respective boxings.

In testimony whereof we affix our signatures.

JACK L. DAY.
EDWARD L. DESCHLER.